US010605321B2

(12) United States Patent
Weilenmann (10) Patent No.: US 10,605,321 B2
(45) Date of Patent: Mar. 31, 2020

(54) TRANSMISSION WITH A TORSION SPRING AND METHOD FOR OPERATING A TRANSMISSION (71) Applicant: Martin Weilenmann, Pfäffikon (CH)

(72) Inventor: Martin Weilenmann, Pfäffikon (CH)

( * ) Notice: Subject to any disclaimer, the term of this patent is extended or adjusted under 35 U.S.C. 154(b) by 147 days.

(21) Appl. No.: 15/744,893

(22) PCT Filed: Jul. 11, 2016

(86) PCT No.: PCT/EP2016/066433
§ 371 (c)(1),
(2) Date: Jan. 15, 2018

(87) PCT Pub. No.: WO2017/012902
PCT Pub. Date: Jan. 26, 2017

(65) Prior Publication Data
US 2018/0209503 A1 Jul. 26, 2018

(30) Foreign Application Priority Data

Jul. 21, 2015 (CH) ........................................ 1059/15

(51) Int. Cl.
F16F 1/14 (2006.01)
F16H 33/02 (2006.01)
F16H 33/08 (2006.01)

(52) U.S. Cl.
CPC ............. F16F 1/145 (2013.01); F16H 33/02 (2013.01); F16H 33/08 (2013.01); F16H 2706/00 (2013.01)

(58) Field of Classification Search
CPC .......... F16H 33/02; F16H 33/06; F16H 33/08; F16H 33/20; F16H 2706/00
See application file for complete search history.

(56) References Cited

U.S. PATENT DOCUMENTS 2,864,259 A 12/1958 Troeger
3,412,617 A * 11/1968 Holzer ................. D06F 39/005
74/3.54

FOREIGN PATENT DOCUMENTS

CN 2168993 Y 6/1994
GB 2400422 A 10/2004
(Continued)

OTHER PUBLICATIONS

International Search Report dated Oct. 6, 2016 for PCT/EP2016/066433 filed Jul. 11, 2016.
(Continued)

Primary Examiner — David R Morris
(74) Attorney, Agent, or Firm — Paul D. Bianco; Gary S. Winer; Fleit Intellectual Property Law (57) ABSTRACT A mechatronic transmission for transmitting a torque from the drive shaft that can be supported axially on a shaft to an output shaft, the rotational speeds of which can have an arbitrary and variable ratio (stepless transmission). The transmission includes a coupling gear and a torsion spring, with the coupling gear rotatably mounted on the same shaft and connected to the output shaft by the torsion spring, and having a first coupling for producing and cancelling a rotationally fixed, planar, force-fitting first coupling between the drive shaft and the coupling gear. The transmission comprises a supporting device which is rotatable having a fixed transmission ratio of 1:X relative to the output shaft, where X can be any real number between approximately −10 and 1, and a second coupling for producing and cancelling a rotationally fixed, force-fitting second coupling between the supporting device and the coupling gear.

14 Claims, 2 Drawing Sheets (56) References Cited

FOREIGN PATENT DOCUMENTS

WO        2012008245 A1    1/2012
WO        2013008624 A1    1/2013

OTHER PUBLICATIONS

Written Opinion for PCT/EP2016/066433 filed Jul. 11, 2016.
International Preliminary Report on Patentability dated Jan. 23, 2018 for PCT/EP2016/066433 filed Jul. 11, 2016.

* cited by examiner

TRANSMISSION WITH A TORSION SPRING AND METHOD FOR OPERATING A TRANSMISSION

TECHNICAL AREA

The invention relates to a transmission for transmitting a torque or power from a drive shaft that can be axially supported on a shaft to an output shaft given an continuously variable transmission ratio, comprising a coupling wheel and a torsion spring, wherein the coupling wheel is rotatably mounted on the same shaft and can be connected with the output shaft by the torsion spring, and also comprising a first coupling means for generating and canceling a rotationally fixed, planar, force-fitting first coupling between the drive shaft and coupling wheel. The invention also relates to a method for operating a transmission.

PRIOR ART

In most applications for engines, the favorable operating ranges of the latter in terms of speed and torque do not lie within the range of the application, which necessitates gearing or transmissions.

Fixed gearings and gearboxes are mostly based on rack-and-pinion constructions in wide-ranging variants or on gear-chain transmissions. Such gearings have only one or a low number of gear stages. As a result, it is not always possible to select the gear ratio that is ideal for the given operating point in terms of consumption or efficiency (or other criteria). In addition, gearboxes have limited-speed switching operations, which are characterized either by tractive effort interruption or lossy dual clutch circuits.

Continuously variable transmissions have this disadvantage.

Such transmissions are called "continuously variable transmissions", since the ratio between the input rotational speed and output rotational speed can be freely selected in a characteristic operating range. Let it here be mentioned that "continuously variable" (English: continuously variable) cannot be confused with "time continuous" (English: time continuous). The possibilities or limits of chronologically changing the gear ratio of continuously variable transmissions will be discussed further below.

Assuming by approximation that such a continuously variable transmission operates losslessly, the input power is identical to the output power. Since the power is the product of torque and rotational speed, the ratio between input and output torque is the exact opposite of the ratio between input and output rotational speed. As a rule, the gear ratio is thus understood as the ratio between the output and input rotational speed. In other words, this corresponds to the ratio between the output and input torque.

In order to better understand how such continuously variable transmissions function, three operating scenarios will now be examined. A road vehicle will here be selected as the example. In the latter, the drive typically consists of an internal combustion engine, which generates a torque on its crankshaft. It is here assumed that this crankshaft is rigidly connected with the drive shaft of the transmission, so that these components are regarded as one. This torque or the corresponding power is transmitted by the continuously variable transmission to the wheels via the drivetrain (output shaft of the continuously variable transmission), and drives the vehicle. It is here assumed that the wheels are firmly in contact with the roadway (no sliding or slipping). For this reason, the rotational speed of the output shaft of the continuously variable transmission is proportional to the vehicle speed. The proportionality factor is made up of the wheel radius and gear ratio for any possible fixed gearings between the continuously variable transmission and drive wheels (e.g., differential) that are built into the drivetrain. Accelerating the vehicle requires overcoming its inertia. This inertia can be computationally transferred to the transmission output with the mentioned proportionality factor.

Therefore, the continuously variable transmission is located between the crankshaft of the engine, which has a relatively low moment of inertia, and the drivetrain, whose large moment of inertia includes the vehicle mass converted with the proportionality factor. Most continuously variable transmissions contain only small moved masses that are not inevitably connected with the drive shaft (crankshaft) or output shaft (drivetrain). By way of simplification, such free masses are disregarded in the following examples. As mentioned, it is also assumed that the continuously variable transmission operates losslessly.

Operating Scenario 1: Constant Driving

If a vehicle is to drive constantly, the power produced by the engine must be completely received and transmitted by the continuously variable transmission. In addition, this power must be at equilibrium with the resistance power of all driving resistances. The resistance power of the vehicle is the vehicle speed multiplied by the sum of all resistance forces. These are the air resistance force, the resistance force due to gradients and the resistance force due to the friction of non-driven wheels and friction in the drivetrain. In like manner, the resistance power is equal to the drive rotational speed multiplied by the output torque. In a continuously variable transmission, the rotational speed ratio in this stationary state of constantly driving can have any value desired (within an operating range). That is to say, this stationary state was set to any gear ratio desired, but one that is currently constant, by controlling the engine power and gearing beforehand. This also means that the ratio between the engine torque and output torque corresponds to precisely this gear ratio.

The engine operating point selected for such a stationary state can here depend on various criteria. Examples: Ideal warm-up rotational speed during a cold start, optimally fuel efficient operation or optimally low-polluting operation.

Operating Scenario 2: Vehicle Acceleration Via Constant Engine Power

It is here assumed that the engine is at a constant operating point (e.g., at maximum power or at an optimal fuel efficient operating point). That is to say, the engine speed, engine torque and thus engine power are constant. To prevent the crankshaft from being accelerated or decelerated by the engine, the continuously variable transmission must absorb the precise torque produced by the engine, and hence the corresponding power. On the one hand, the output torque, and hence the output power, of the transmission must be greater than the resistance torque, and hence the resistance power, of the vehicle, so that the latter accelerates. On the other hand, the output power of the continuously variable transmission is exactly the same as the drive power in the lossless case. Since the vehicle speed, and hence the output rotational speed, of the transmission change continuously, the output torque of the transmission must be continuously adjusted (since output torque=output power/output rotational speed).

During this acceleration process, the resistance power on the vehicle can change continuously, e.g., due to increasing air resistance or changing gradients. As a consequence, the developing vehicle speed, and hence the output rotational speed, is a priori unknown. Therefore, the transmission control unit must continuously measure the output rotational speed and control the output torque. The transmission control unit thus does not directly control the ratio between the rotational speeds (which develops based upon external influences), but rather the torque ratio.

This example also applies analogously to vehicle decelerations. Of course, the resistance power must then be greater than the drive power.

Operating Scenario 3: Constant Travel with Changing Drive Speed

The vehicle here is to drive at a constant speed while the state of the engine is to be shifted from a first to a second operating point. It is here assumed that the resistance forces, and hence the resistance power, on the vehicle remains constant. As a consequence, the drive power (engine power) must be the same at the beginning and end of this operation. If the rotational speed is lower at the end of the operation, for example, the engine torque must be correspondingly higher (and vice versa).

During this operation, the output of the transmission must release a constant power, and hence a constant torque, at a constant rotational speed. The corresponding power must be absorbed from the drive shaft (crankshaft) by the transmission. The transmission control unit must thus guide the continuously variable transmission in such a way that a continuously rising torque is absorbed by the drive shaft, adjusted to the continuously falling rotational speed of the drive.

The engine control unit must on its part ensure that the engine produce a somewhat lower power (i.e., a currently somewhat lower torque) than that absorbed by the continuously variable transmission, for example during a reduction in rotational speed. Only in this way can the crankshaft (inertia) of the engine reduce its rotational speed (angular momentum).

In this operating scenario as well, the transmission control unit must from a physical standpoint control (change) a torque (the one on the drive shaft). The engine rotational speed arises from the deceleration (or acceleration) of the crankshaft due to the difference between the torque produced by the engine and tapped by the transmission.

General non-stationary operating scenarios in which both the input rotational speed (engine speed, drive rotational speed) and the output rotational speed (vehicle speed, output rotational speed) change can be interpreted as a combination of the operating scenarios and 3 described above, wherein accelerations with both signs are possible for the two shafts.

In summation: Since both the moments of inertia for the drive (engine) and output (vehicle) are not negligible, the continuously variable transmission or its control unit cannot directly set rotational speed ratios. When changing the gear ratio, the continuously variable transmission in conjunction with the engine or engine control unit must provide for a torque imbalance, so that the corresponding inert masses are accelerated or decelerated. This physical fact notwithstanding, the vernacular falsely states that the transmission controls its gear ratio.

This overall approach is independent of the effective layout of the continuously variable transmission, which is generally applicable.

Let it further be noted that these considerations have previously assumed that the continuously variable transmissions absorb or released torques that are chronologically constant in operating scenario 1 and continuously changing in operating scenarios 2 and 3. Viewed in detail, however, specific variants of gearboxes and continuously variable transmissions generate torques that frequently undergo periodic chronological changes due to their construction. For example, these irregularities are caused in gear wheels by the elasticity of the teeth or their wear (geometry error) or in chain gears (motorcycles) by the expansion of the links. Each new tooth mesh generates a certain torque fluctuation during operation. Even in continuously variable chain variators, the links entering into the bevel gears can lead to such torque fluctuations.

Since these fluctuations are high-frequency, meaning that they quickly repeat themselves over time (typically within a range of several milliseconds or faster), the corresponding torque excess or deficiency can only infinitesimally accelerate or decelerate the inert masses, or these high-frequency fluctuations are smoothened out by the elasticities of the drive and output shafts. In other words, a periodic torque that changes quickly enough over time has the same effect as viewed over a period as a constant torque, which corresponds to the average value for the periodic torque.

The invention described below directly uses the fact that the torques can be subjected to high-frequency, periodic changes without any disadvantage.

Known embodiments of continuously variable transmissions include friction transmissions, e.g., in a plate layout, cone ring transmissions or toroidal transmissions. In all of these transmissions, the force is conveyed from one rotating component to another through static friction. Another position of the contact point in a radial direction yields another gear ratio.

Based on the above approach, a torque imbalance must be generated at least on one side of the transmission (drive or output) while changing the gear ratio. The disadvantage to all of these systems is that the force is transmitted through frictional engagement in a punctiform zone when flattened portions are disregarded. Large contact forces must prevail to prevent slippage, resulting in high loads on the components.

It is further disadvantageous that the gear ratio can only be changed slowly and not at standstill, since the one friction body has to roll onto the other not purely tangentially, as in stationary states, but rather slightly radially, so that the contact point moves to another radius.

One alternative involves continuously variable transmissions with belt or chain concepts. In the latter, a belt or chain runs between two disk pairs, which are secured to the drive and output shaft. The facing sides of the disks are formed in such a way as to yield a V- or wedge-shaped gap for the belt or chain. The circumferential radius of the belt, and hence the gear ratio, can be set by axially shifting the one disk of each disk pair. During this process, constraint torques develop between the converging disks and the chain (or belt), which contribute to the torque imbalance described above. At the same time, the chain (or belt) must here change its radial position between the disk pairs, but this can only take place via several rotations of the disks, because structurally tight limits are placed on the maximum radius difference between the friction points as the chain (or belt) enters and exits.

The area where force is transmitted from the disks to the belt or chain is theoretically linear, but is limited by expansion phenomena to a small region of the circumference. As a result, these transmissions have roughly the same disadvantages as the friction gears, specifically a punctiform frictional engagement, which produces high contact pressures and only allows rapid transmission changes to a limited extent.

As mentioned, stepped transmissions cannot represent any gear ratios desired. All known mechanical, continuously variable transmissions have the disadvantage that the force is transmitted via friction in a punctiform or linear zone, which translates into high contact forces, and hence a high surface load for the components. Given the latter, the gear ratio can additionally only be changed in motion, and only at a limited speed.

In particular the drivetrains of road vehicles are in practice exposed to frequent and very quickly changing loads. Only continuously variable and quickly varying transmissions would allow the drive engines to always operate in an optimal operating state with these load profiles. This optimality can here minimize consumption, pollutants or even wear or other criteria, for example.

Documents WO2012008245 A1 and WO2013008624 A1 describe continuously variable transmissions with four-bar arcs. Several four-bar arcs with corresponding swivel bodies are arranged on the drive. All of these swivel bodies can be connected with the drive shaft via freewheels, so that the fastest one at the time is always engaged and transmits energy. The continuously variable transmission comes about by varying the eccentricity of the four-bar arcs. The movement of the driveshaft thereby becomes not precisely continuous, but rather wavelike, since it is composed of the maximum ranges for the oscillation movement of the oscillating bodies. Since the movement (rotational speed) of the output shaft is inevitably wavelike, this solution reveals a completely different characteristic than when the torques underwent high-frequency fluctuations as described above. In particular, significantly stronger vibrations are here to be expected.

Described in GB 2400422 A is another continuously variable transmission, in which a spring intermittently absorbs energy from a drive shaft and releases it to an output shaft arranged concentrically to the spring, and comes to oscillate in the process. Power transmission is handled by ledges on the spring on which it intermittently abuts against beams. The described transmission has a complicated structural design, wherein it is unclear how the output shaft can be reliably driven in a controlled manner.

Document U.S. Pat. No. 2,864,259 describes a continuously variable transmission in which a uniform rotational movement is transformed into pendulum movements by way of cams (four-bar arcs), and these pendulum movements drive forward an intermediate shaft via freewheel clutches (overrunning clutches), wherein the pendulum movement that just happens to be fastest in the forward direction is engaged at any one point in time. As a result, this intermediate shaft performs a wavy forward movement. It is connected with the drive by a torsion bar (torsion spring). The intermediate shaft uses the torsion bar to drive the drive. As mentioned in the text, a rotational speed that depends on the load, i.e., the load torque, on the output arises at the output at a constant rotational speed of the drive, which is disadvantageous. The desired drives are to enable any gear ratios desired at any loads (in the operating range). U.S. Pat. No. 2,864,259 is characterized by the use of passive freewheel clutches, which do not allow any couplings at freely selectable points in time.

DESCRIPTION OF THE INVENTION

The object of the present invention is to indicate a continuously variable, mechatronic transmission of the kind described at the outset that has a simple and reliable structural design, and in which no friction losses and wear arise due to grinding couplings or punctiform transmissions via chains or belts. This invention utilizes the aforementioned fact that a torque subjected to high-frequency changes that acts on the inert masses of the drive (e.g., crankshaft of an internal combustion engine) and output (drivetrain and vehicle) essentially has the same effect as a constant torque, which corresponds to the chronologically average value of the torque undergoing high-frequency changes.

Another object of the invention is to describe a method in which power is transmitted by means of such a mechatronic transmission.

The object is achieved by the distinguishing characteristic in the independent claims. Preferred devices are indicated in the subclaims.

The idea of the invention described below outlines how the transmission works within a short period of time (cycle). Whether the transmission here operates at a constant gear ratio (operating scenario 1), the rotational speed of the output changes (operating scenario 2), the rotational speed of the drive changes (operating scenario 3), or both rotational speeds change (combination of operating scenarios 2 and 3) is derived from the torque equilibriums of the drive and output shafts over one or several complete periods (cycles) of this kind.

According to the invention, the transmission comprises a support device (e.g., a ring, a disk or a hollow shaft), which is connected and can rotate with the output shaft at a fixed gearing of 1:X, wherein X can be any real number between −10 and 1. In addition, the transmission according to the invention comprises a second coupling means for generating and canceling a rotationally fixed, force-fitting second coupling between the support device and coupling wheel.

In the idea underlying the invention, couplings between the rotating parts are only generated if the latter have the same rotational speed. In this case, no friction, and hence no energy loss, arises in the coupling process. In order to be able to achieve this, the coupling wheel is connected with the output shaft by the torsion springs, so that the coupling wheel can also reach faster rotational speeds than the output shaft by absorbing the energy stored in the torsion spring, in particular the much higher rotational speed of the drive shaft.

With each working circuit, the torsion spring swivels out into its extreme position once, varyingly accelerating and braking the coupling wheel unilaterally secured thereto. For example, in one moment of standstill, a coupling between the coupling wheel and also idle support device can be smoothly established.

In the method according to the invention for transmitting a torque or power from a rapidly rotating drive shaft to a more slowly rotating output shaft, the coupling wheel is coupled to the drive shaft by the first coupling means as soon as the coupling wheel and drive shaft have the exact same rotational speed. It is here assumed that energy was stored in the spring beforehand, which accelerated the coupling wheel to the (higher) rotational speed of the drive shaft. As a consequence, it turns out that this energy is simply present at the end of the preceding working circuit. The starting process will be explained further below. As a consequence, the torsion spring is tensioned, and energy is simultaneously transmitted from the drive shaft to the output shaft via the torsion spring. At a high tension of the torsion spring, the coupling wheel is decoupled from the drive shaft, so as to allow the coupling wheel to freewheel and continue turning as the rotational speed drops. As soon as the coupling wheel and support device have the exact same rotational speed, the coupling wheel is coupled to the support device by the second coupling means, so as to transmit energy from the torsion spring to the output shaft. Finally, at a low tension of the torsion spring, the coupling wheel is decoupled from the support device, so as to let the coupling wheel to rise again while freewheeling. The process then starts over again from the beginning.

BRIEF DESCRIPTION OF THE DRAWINGS

The invention will be explained in greater detail below with reference to the drawings. Shown on:

FIG. 2b the angle of twist of the torsion springs;

FIG. 2c the rotational speed of the coupling wheel;

FIG. 2d the torque acting on the output shaft;

WAYS OF IMPLEMENTING THE INVENTION

Figure 1:
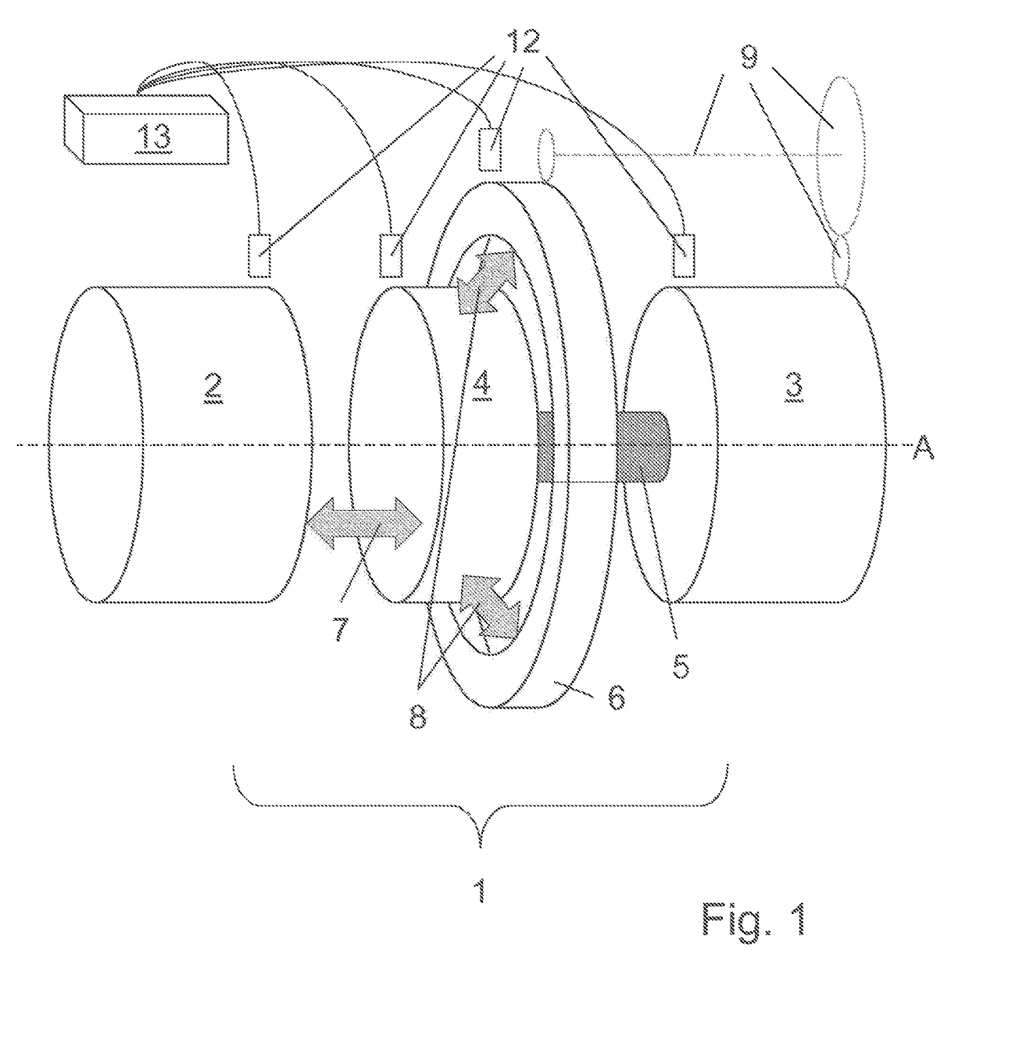
FIG. 1 is a schematic illustration of a transmission according to the invention in a perspective view.

FIG. 1 presents a schematic, perspective view of a mechatronic transmission 1 according to the invention for the continuously variable transmission of a torque or power from a drive shaft 2 that can be axially mounted on a shaft A to an output shaft 3. The transmission 1 comprises a coupling wheel 4 and a torsion spring 5, wherein the coupling wheel 4 is rotatably mounted on the same shaft A and connected by the torsion spring 5 with the output shaft 3. In addition, the transmission 1 comprises a first coupling means 7 for generating and lifting a rotationally fixed, planar, force-fitting first coupling between the drive shaft 2 and coupling wheel 4. According to the invention, the transmission 1 also comprises a support device 6, which is connected with the output shaft 3 at a fixed gearing of 1:X, e.g., by means of a gear drive 9, and rotatably mounted around the shaft A, wherein X can be any real number between approx. −10 and 1. In particular, X can be zero, so that the support device 6 is fixedly connected with a housing of the transmission, for example. The gear drive 9 is omitted in this special case. In the other cases, the support device 6 can be configured as a ring, a disk or a hollow shaft, which is rotatably mounted around the shaft A, and as mentioned is connected with the output shaft 3 at a fixed gearing of less than 1 (e.g., by gears).

In addition, the transmission 1 comprises a second coupling means 8 for generating and lifting a rotationally fixed, force-fitting second coupling between the support device 6 and coupling wheel 4.

The coupling wheel 4 is advantageously arranged coaxially to the output shaft 3, so that the drive shaft 2, coupling wheel 4 and output shaft 3 are all mounted on the same shaft A.

The first and second coupling means 7 and 8 can preferably each consist of a magnetic or mechanical coupling with a pressing mechanism or some other coupling between the respective drive shaft 2 or support device 6 and the coupling wheel 4.

According to the invention, the couplings are each only closed when the components on either side of the coupling have the same rotational speed. This prevents wear from arising, and losses are minimized.

If the first coupling means 7 has been activated, the coupling wheel 4 and drive shaft 2 inevitably move at the same rotational speed. As soon as this first coupling means 7 has again been detached, the coupling wheel 4 and drive shaft 2 can again move at different rotational speeds around the shaft A.

If the second coupling means 8 has been activated, the coupling wheel 4 and support device 6 inevitably move at the same rotational speed, or both stand still. This rotational speed is lower than the rotational speed of the output shaft 3, which can also rotate in the opposite direction. Its gear ratio relative to the output shaft 3 is always constant, and less than or equal to 1. As a result, the torsion spring 5 slackens and releases energy to the output 3 in those steps where the coupling means 8 is closed. As soon as this second coupling means 8 is detached again, the coupling wheel 4 and support device 6 can once more move around the shaft A at different rotational speeds. The coupling means 7, 8 are located between the drive shaft 2 and coupling wheel 4 or between the support device 6 and coupling wheel 4, and are only denoted by arrows on FIG. 1.

In particular, the transmission according to the invention can have sensors 12. The latter are used to determine absolute and/or relative rotational speeds of the coupling wheel 4, as well as of the drive shaft 2, output shaft 3 and/or possibly the support device 6.

In particular, such sensors 12 are intended to make it possible to determine when the coupling wheel 4 and the respective drive shaft 2 or support device 6 have the same current rotational speeds. If this is the case, the drive shaft 2 or support device 6 can be coupled to the coupling wheel 4 by the corresponding coupling means 7 or 8 without any friction losses arising. For example, such sensors 12 can be optical sensors, which optically acquire a fine grid secured to the coupling wheel 4, drive shaft 2, output shaft 3 and/or support device 9.

Finally, a control unit can close and release the couplings 7 and 8 at suitable points in time based on the acquired rotational speeds. Corresponding lines connecting the control unit 13 to the coupling means 7, are not shown on FIG. 1. The data can also be transmitted from the sensors 12 to the control unit 13 and from the latter to the coupling means 7 and 8 through telemetry. The control unit 13 must also be connected with the user and typically also with the drive control unit, which prescribe the respectively desired acceleration, power or torque. These connections are also not depicted. The control unit calculates the respectively suitable points in time for coupling and releasing the coupling means 7 and 8 based on information specified by the user or drive control unit, and thereby defines the steps (a) to (d) of operation, as shown on FIG. 2. For example, the user information can be transmitted by actuating the gas pedal of a vehicle.

In special cases, the transmission 1 according to the invention can have at least one second support device 6', which is connected with the output shaft 3 at a fixed gearing X' different than that of the first support device 6 and rotatably arranged thereon. Depending on the situation, the respective first or second support device 6, 6' can then be used. The second support device 6' can otherwise be configured identically to the first support device 6, and is not indicated on the figure. The use of at least one second support device 6' with a different fixed gearing X' expands the spread and power range of the transmission.

According to the invention, the torsion spring 5 can have a progressive characteristic. This can in turn result in advantages relative to the transfer characteristic.

Figures 2, 2A, 2E:
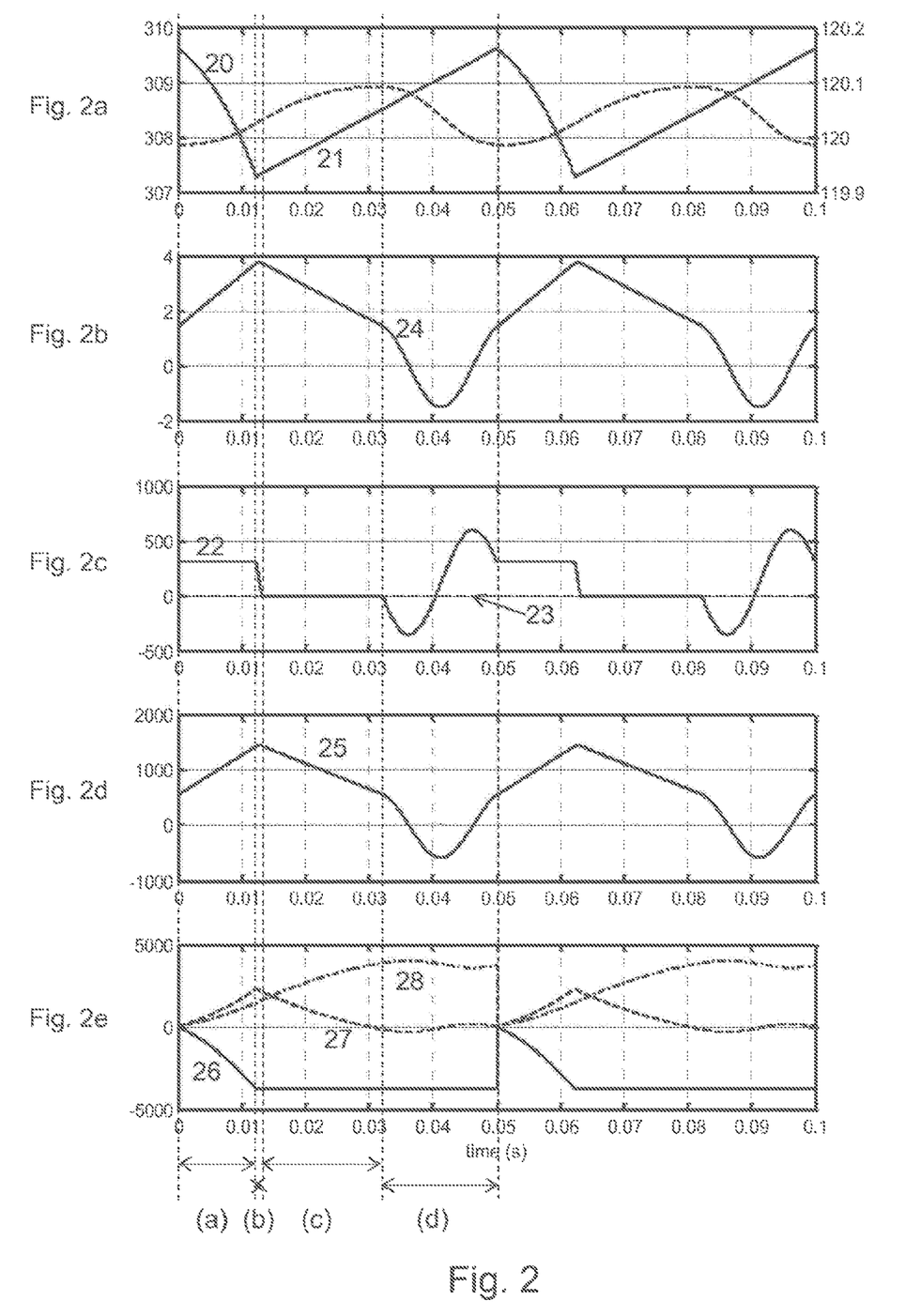
FIG. 2 is a progression of two cycles as a function of time, in particular.
FIG. 2a the rotational speeds of the drive and output shaft.
FIG. 2e the transmitted energy

The following steps are performed in the cyclic method according to the invention for transmitting a torque or power from a drive shaft 2 to an output shaft 3 using a mechatronic transmission 1 according to the invention, and are illustratively described here drawing upon FIG. 2. The individual, chronologically sequential steps (a) to (d) of a working cycle are also indicated at the bottom of FIG. 2*e*.

FIG. 2*a* shows the rotational speeds 20 and 21 of the drive 2 and output 3. The rotational speed of the coupling wheel 22 is depicted on FIG. 2*c*. At certain times, it corresponds to the rotational speed 23 of the support device 6, in particular when the latter are coupled together. FIG. 2*b* shows the angle of twist 24 of the torsion spring 5. Every one of FIGS. 2*a* to 2*e* illustrates two complete cycles of the claimed method, with each cycle lasting 0.05 s.

FIG. 2*d* shows the torque 25 that acts on the output shaft 3. FIG. 2*e* shows the energies released or absorbed by individual components during a working cycle. The energy 26 released by the drive shaft (energy release depicted negatively) here corresponds to the sum of energies 27 and 28. The energy 27 is absorbed jointly by the torsion spring 5 and coupling wheel 4. The energy 28 is absorbed by the output shaft 3. In areas where the energy 26 released by the drive shaft is zero, in particular in step (c), the output shaft 3 receives the energy 28 corresponding to the energy 27 that is released by the torsion spring 5 and coupling wheel 4, and thus tapers.

Steps (a) to (d) of a cycle will subsequently be described based on the example of FIG. 2:

In this specification, it is assumed that the transmission is already in operation. In other words, it is assumed that the drive shaft 2 at the beginning rotates at a rotational speed (angular speed) of approx. 310 rad/s (=approx. 3000 RPM). The output shaft 3 at the beginning rotates at a lower rotational speed of approx. 120 rad/s (=approx. 1150 RPM). The torsion spring 5 was preloaded while starting up the entire system. If the two coupling means 7 and 8 are separated, this preloading on the torsion spring 5 causes the coupling wheel 4 to rotationally swivel around the shaft A with the natural frequency of this spring-mass system. This state is also referred to as freewheeling. Viewed from the output shaft 3, the coupling wheel 4 rotationally swivels back and forth. Viewed from the inertial system, the coupling wheel rotates once more slowly, and once more quickly, than the output shaft 3. During this oscillation (step 23 on FIG. 2*c*), the coupling wheel 4 reaches high rotational speeds in excess of the rotational speed of the drive shaft 2. It also reaches rotational speeds that are negative, i.e., it briefly rotates backward. The average rotational speed of the coupling wheel 4 is identical to the rotational speed of the output shaft 3.

Four steps now take place for transmitting the torque and power: At a point in time where the coupling wheel and drive shaft 2 have the exact same rotational speeds 22, 20 and the torsion spring is forwardly loaded, step (a) is initiated by coupling the coupling wheel to the drive shaft 2 via the first coupling means. During the entirety of step (a), the coupling wheel 4 rotates at the same rotational speed 22 or 20 as the drive shaft 2. As a result, the torsion spring 5 is loaded to a maximum angle of twist 24, and energy 26 is simultaneously transmitted from the drive shaft 2 to the output shaft 3 via the torsion spring 5 as energy 28. A portion of this energy 26 is absorbed as energy 27 by the torsion spring 5 and coupling wheel 4. These energy transmissions result in the drive shaft 2 being lightly decelerated. In the example, the rotational speed of the drive shaft drops by less than 1%. At the same time, the output shaft is slightly accelerated (by less than one thousandth).

Given a high tension for the torsion springs 5, and hence a high angle of twist 24, step (b) is introduced by decoupling the coupling wheel 4 from the drive shaft 2. As a result, the freewheeling coupling wheel 4 now continues to rotate at a falling rotational speed. In this step (b), the drive shafts 2 transmits no energy. The coupling wheel 4 is delayed in its free oscillation, and releases a portion of its energy on the further tensioning torsion spring 5. It releases another portion to the output shaft 3. These amounts of energy are comparatively small. The output shaft 3 thus only accelerates to a minimal extent in this step.

As soon as the coupling wheel 4 and support device 6 have the exact same rotational speeds 22, 23, step (c) is introduced by coupling the coupling wheel 4 to the support device 6 via the second coupling means 8. In the example, the support device 6 consists solely of a typically circular portion of the housing that serves as a counterpart to the coupling wheel 4 for the coupling device 8. In other words, the coupling wheel 4 is connected in a force-fitting manner with the housing at the moment its absolute rotational speed happens to be zero.

In general, the support device 6 can be viewed as designed as a ring, disk or hollow shaft, which is mounted so that it can rotate around the shaft A, and connected with the output shaft 3 via a transmission 9 having a fixed gearing of less than 1, e.g., by means of the gear drive 9. In other words, as soon as the output shaft 3 rotates, so too does the support device 6, but more slowly or backward. In this general case as well, the support device 6 is configured in such a way that the coupling device 8 can connect it in a force-fitting manner with the coupling wheel 4.

During the entirety of step (c), the coupling wheel 4 rotates at the same rotational speed 23 as the support device 6 (both are standing still in the example). Since the support device 6 rotates more slowly than the output shaft 3 (or stands still), the torsion spring 5 slackens, and the energy 27 absorbed by the torsion spring 5 in step (a) is again released, and simultaneously absorbed by the output shaft 3 as energy 28. This accelerates the output shaft somewhat. In the example, by a bit less than 1%.

Given a low tension of the torsion spring 5, and hence a low angle of twist 24 of the torsion spring 5, which corresponds roughly to the angle of twist 24 at the beginning of step (a), the last step (d) is introduced by again decoupling the coupling wheel 4 from the support device 6. The coupling wheel 4 freewheels during the entire step (d), and continues to rotationally oscillate back and forth relative to the output shaft 3. In this step, the coupling wheel 4 and torsion spring 5 pendulously exchange kinetic energy and potential (spring) energy (not shown). A small amount of energy is also exchanged with the output 3: the energies 27 and 28 here oscillate in an opposite direction.

The point in time where the coupling wheel 4 again rotates exactly as fast as the drive shaft 2 as the rotational speed falls marks the conclusion of step (d), and with it of the entire working cycle, which consists of steps (a) to (d). At this time, a new cycle is introduced by starting over with step (a).

The case depicted on FIG. 2 corresponds to an operating scenario 1. A drive (engine) delivers a constant power (energy per unit time) to the drive shaft 2, while the resistances on the output shaft 3 absorb precisely the same constant power. The output shaft 2 is somewhat decelerated through the extraction of energy in step (a). During steps (b) to (d), no additional energy is extracted from it, but the drive (engine) supplies it with constant energy during all steps. The total energy supplied is here equal to the energy removed in step (a). As a consequence, there on average exists a power equilibrium, which is why the rotational speed of the drive shaft 2 remains precisely the same at the beginning and end of the entire sequence.

Similar considerations hold true for the output shaft 3: While it absorbs energy from the drive shaft 2 and torsion spring 5 in steps (a) to (c), it returns some energy to the torsion spring 5 in step (d). The sum of energy amounts exchanged is exactly equal to the energy removed over the entire time as a result of wear resistances. As a consequence, the output shaft 3 has precisely the same rotational speed at the beginning and end of the entire sequence. The entire sequence can thus precisely repeat itself over a prolonged period, which corresponds to a stationary operation.

This sequence can (within a technical range) take place at any gear ratios, which is why this invention acts like a continuously variable transmission.

If a different average torque (a different power) had to be transmitted at the same rotational speeds for the drive shaft 2 and output shaft 3, the durations of steps (a) and (c) would be correspondingly adjusted. For example, the steps (a) and (c) would be shorter at a lower transmitted power, causing the torsion spring 5 to absorb and release less energy.

If this transmission were in operating scenario 2, the same picture as above would emerge for the drive shaft 2. However, the resistances (resistance power) at the output would be smaller than the power transmitted by the transmission. As a result, the rotational speed of the output shaft 3 would be somewhat higher after each cycle than before, making it necessary to slightly adjust the times at which the coupling means 7 have to be opened and closed by the control unit from cycle to cycle.

In operating scenario 3, the power introduced to the drive shaft 2 by the drive (engine) would be somewhat smaller than the average power (energy per unit time) absorbed by the transmission, as a result of which the rotational speed of the drive shaft 2 would be lower after the entire cycle than at the beginning, i.e., would drop off overall. Conditions would remain constant at the output shaft 3, as in operating scenario 1. The times at which the coupling means 7 and are opened and closed would here also have to be continuously adjusted from cycle to cycle.

Therefore, the change in the gear ratio is not initiated by having a mechanical force act on a component (lever) as in other continuously variable transmissions, but rather by changing the switching times of the couplings, and thereby of the transmitted average powers. Therefore, they are pre-calculated and managed by the control unit, which is why the transmission is also referred to as "mechatronic".

In a preferred method, the rotational speed 23 of the support device 6 is a constant zero. As a consequence, it can be fixedly mounted, and need not be rotatably mounted on a shaft.

In particular, a complete cycle from (a) to the next (a) should typically last for at most 50 ms for automobiles, so as not to induce excessively low-frequency vibrations in the drivetrain. As a result, a user perceives the transmission as jerk-free. The reaction by the system to a changed control command takes at best two of such cycles, i.e., at most 100 ms. Such a reaction time is perceived by the user as immediate. The respective time for coupling and decoupling the coupling means 7, 8 should measure at most about one hundredth of the cycle time, meaning about 0.5 ms, for example, so as to meet the aforementioned condition that coupling take place at the same rotational speed of the coupling partners. In particular, a control unit 13 can initiate the introduction of steps (a) to (d). This control unit 13 also receives user commands, and coordinates power transmission with the drive control unit.

In order to transmit low powers, it may be advantageous that the duration of a complete cycle from (a) to the next (a) be lengthened by a waiting phase. Such a waiting phase can be introduced by introducing an additional coupling means between the output shaft 3 and coupling wheel 4 (not sketched in). This coupling means is also only coupled when the coupling wheel 4 and output shaft 3 have the same rotational speeds 22, 21, so that no losses arise. After a certain period of time, the coupling means is again detached. As long as this coupling remains activated, the torsion spring retains its preload, and neither releases nor absorbs energy. This coupling is typically activated in step (d). As a result, the duration of the complete cycle from (a) to the next (a) can be extended. In particular, this makes it possible to select a constant duration of the complete cycle for all operating scenarios, which can be advantageous for avoiding resonances in the entire drivetrain.

The partial steps of the complete cycle described here can take place given any ratios between the drive rotational speed and output rotational speed. As a consequence, power transmission can take place at any gear ratios. The transmission behaves like a continuously variable transmission.

As opposed to other versions of continuously variable transmissions in which the gear ratio is changed as the result of forces acting on certain components (levers) and resultantly triggered torque imbalances, the control unit here changes the lengths of steps (a) and (c), so that (on average over the entire cycle) a changed torque is transmitted, which finally leads to an acceleration or deceleration of the drive and/or output, and thus to a gearing change.

If this transmission is in the operating scenario 1 described at the outset, the transmission control unit must keep the average power absorbed by the drive shaft (over a cycle) precisely the same as the average power output to the drive shaft by the drive (engine). As a result, the average rotational speed of the drive shaft does not change from cycle to cycle. In like manner, the (identical when disregarding losses) average power output to the output shaft over the cycle must be kept equal to the resistance power, so that the average rotational speed of the output shaft does not change. Irrespective of the above, the drive control unit (engine control unit) must ensure that the power output by the drive (engine) is at equilibrium with the resistance power.

In operating scenario 2, the transmission control unit must keep the average power absorbed by the transmission the same as the power output by the drive (engine) to the drive shaft. In the lossless case, the same power is released to the output. Since this power is greater than the resistance power on the vehicle, the output accelerates. Because the output rotational speed thus changes from cycle to cycle, the transmission control unit must ensure that the released average torque in conjunction with the current output rotational speed yields the (constant) drive power.

In operating scenario 3, the transmission control unit has to keep the average power output by the transmission the same as the resistance power, so that the output rotational speed remains constant. In a lossless case, the same power must be absorbed by the drive. This average power is greater than the power generated by the drive (engine), as a result of which the drive shaft is decelerated. Because the drive rotational speed changes from cycle to cycle, the transmission control unit must ensure that the absorbed average torque in conjunction with this drive rotational speed yields the power to be released. At the same time, the drive control unit (engine control unit) must ensure that the power generated by the drive is less than the power to be released.

For purposes of examining the processes within a cycle, the rotational speeds of the drive and output can be viewed as roughly constant based on the large inertias. An appreciable change in rotational speeds only develops at one of the shafts over entire or several cycles given a power imbalance (torque imbalance).

Irrespective of the above, this transmission is able to very rapidly (within one cycle) generate such imbalances, and thus rapidly accelerate or decelerate one of the shafts (typically the drive shaft), i.e., quickly change the gear ratio, since the transmitted power can be changed from one cycle to the next. As opposed to continuously variable friction and chain gears, no elevated transmission losses arise during such transient processes either.

In addition, this continuously variable transmission, just as all transmissions, can transmit torques from a maximum value up to a value of zero and even up to a negative maximum value at each gear ratio. While no influence must be exerted for this purpose in many transmissions, the lengths of steps (a) and (c) must be synchronously changed in the correct manner. For example, when traveling on an undulating street course at a constant speed, power can be transmitted on an incline, and power can return to zero or negative values on a decline. It here makes no difference whether the drive (engine) keeps its rotational speed constant or varies it.

This continuously variable transmission can also be used for start-up purposes, i.e., to accelerate the output shaft from a standstill. When cranking the engine, the coupling means 7 must to this end be closed until such time as the torsion spring 5 has stored an amount of energy that allows the coupling wheel 4 to reach at least the idle speed of the engine while freely oscillating on the torsion spring 5. The coupling means 7 is then opened, and the coupling wheel allowed to oscillate freely. In this process, the output shaft 3 must be decelerated. Given a prolonged idling, it may be necessary to again connect the coupling wheel 4 with the drive 2 with the coupling means 7, so as to replace energy lost to friction. During start-up, the brake on the output shaft 3 is released, and a direct transition can be made into the operation described above.

REFERENCE LIST

1 Transmission
2 Drive shaft
3 Output shaft
4 Coupling wheel
5 Torsion spring
6, 6' Support device
7 First coupling means
8 Second coupling means
9 Gear drive, reduction gear between the output shaft 3 and support device 6
12 Sensors
13 Control unit/transmission control unit
20 Rotational speed of the drive shaft 2
21 Rotational speed of the output shaft 3
22 Rotational speed of the coupling wheel 4
23 Rotational speed of the support device 6
24 Angle of twist of the torsion spring 5
25 Torque acting on the output shaft
26 Energy released by the drive shaft 2 (release=negative values)
27 Energy absorbed by the torsion spring 5
28 Energy absorbed by the output shaft 3
A Axle of drive shaft
X, X' Fixed gear ratio between the support device and output shaft 3
(a) Coupling the drive shaft with the coupling wheel, energy transmission
(b) Decoupling the coupling wheel, freewheeling
(c) Coupling the coupling wheel with the support device, energy transmission
(d) Decoupling the coupling wheel, freewheeling

The invention claimed is:

1. A transmission for continuously variable transmission of a torque or power from a drive shaft axially supported on a shaft to an output shaft, the transmission comprising:
   a coupling wheel and a torsion spring, wherein the coupling wheel is rotatably mounted on the shaft and connected to the output shaft by the torsion spring;
   a first coupling for generating and canceling a rotationally fixed, planar, force-fitting first coupling between the drive shaft and the coupling wheel;
   a support device, which is connected to and rotatable with the output shaft at a fixed gearing of 1: X, wherein X can be any real number between −10 and 1; and
   a second coupling for generating and canceling a rotationally fixed, force-fitting second coupling between the support device and the coupling wheel,
   wherein the transmission is connected with a control unit and several sensors, wherein the sensors are used to determine absolute and/or relative rotational speeds of the coupling wheel, drive shaft, output shaft and/or support device, so that the control unit can initiate the generation and cancelation of the coupling by the first and second couplings based on determined rotational speeds at suitable times, so that the first and second couplings can be coupled or decoupled at freely selectable times.

2. The transmission according to claim 1, wherein the coupling wheel is arranged coaxially to the output shaft.

3. The transmission according to claim 1, wherein the support device is fixedly connected with a housing of the transmission.

4. The transmission according to claim 1, wherein at least one of the first and second couplings includes a magnetic or mechanical coupling between the drive shaft or support device and the coupling wheel.

5. The transmission according to claim 1, wherein second support device is rotatably arranged relative to the output shaft at a fixed gearing 1:X' and wherein X' is different than X.

6. The transmission according to claim 1, wherein the torsion spring has a progressive characteristic.

7. The transmission according to claim 1, further comprising an additional coupling between the output shaft and coupling wheel.

8. A method for continuously variable transmission of torque or power from a drive shaft to an output shaft, the method comprising:
   (a) coupling a coupling wheel to the drive shaft with a first coupling as soon as the coupling wheel and drive shaft have equal rotational speeds, so as to tension a torsion spring and simultaneously transmit additional energy from the drive shaft to the output shaft via the torsion spring;
   (b) decoupling the coupling wheel from the drive shaft at a high angle of twist of the torsion spring, so as to allow the coupling wheel to freewheel and continue rotating as the rotational speed of the coupling wheel drops;

(c) coupling the coupling wheel to a support device with a second coupling as soon as the coupling wheel and support device have equal rotational speeds, so as to transmit energy of the torsion spring to the output shaft;

(d) decoupling the coupling wheel from the support device at a low angle of twist of the torsion spring, so as to allow the rotational speed of the coupling wheel to increase again while freewheeling until the coupling wheel and the drive shaft again have equal rotational speeds as the rotational speed of the coupling wheel drops, wherein the process continues again with step (a).

9. The method according to claim 8, wherein rotational speed of the support device is a constant zero.

10. The method according to claim 8, wherein a complete cycle from (a) to the next (a) lasts at most 50 ms.

11. The method according to claim 8, wherein the respective time for coupling and decoupling lasts at most 0.5 ms.

12. The method according to claim 8, wherein a control unit initiates each of steps (a) to (d).

13. The method according to claim 8, wherein an additional coupling is coupled between the output shaft and coupling wheel at a point in time where the output shaft and coupling wheel have equal rotational speeds, and are again detached after a certain period of time.

14. The method according to claim 13, wherein the additional coupling occurs during step (d).

* * * * *